US010216941B2

(12) United States Patent
Seo et al.

(10) Patent No.: US 10,216,941 B2
(45) Date of Patent: Feb. 26, 2019

(54) METHOD OF DISTRIBUTING APPLICATION WITH SECURITY FEATURES AND METHOD OF OPERATING THE APPLICATION

(71) Applicant: LINE Corporation, Tokyo (JP)

(72) Inventors: Dong Pil Seo, Seongnam-si (KR); Sun Tae Kim, Seongnam-si (KR); Wang Jin Oh, Seongnam-si (KR); Yoon Seok Kim, Seongnam-si (KR); Sang Hun Jeon, Seongnam-si (KR)

(73) Assignee: Line Corporation, Tokyo (JP)

( * ) Notice: Subject to any disclaimer, the term of this patent is extended or adjusted under 35 U.S.C. 154(b) by 553 days.

(21) Appl. No.: 14/824,327

(22) Filed: Aug. 12, 2015

(65) Prior Publication Data

US 2016/0292432 A1    Oct. 6, 2016

(30) Foreign Application Priority Data

Apr. 3, 2015   (KR) .......................... 10-2015-0047585
Jun. 19, 2015  (KR) .......................... 10-2015-0087252

(51) Int. Cl.
*G06F 21/60*   (2013.01)
*G06F 8/61*    (2018.01)
(Continued)

(52) U.S. Cl.
CPC .............. *G06F 21/602* (2013.01); *G06F 8/61* (2013.01); *G06F 21/568* (2013.01); *H04L 67/34* (2013.01)

(58) Field of Classification Search
CPC ......... G06F 21/603; G06F 21/358; G06F 8/61
(Continued)

(56) References Cited

U.S. PATENT DOCUMENTS 7,546,595 B1 *  6/2009  Wickham ................. G06F 8/65
                                                      717/168
8,296,605 B2 * 10/2012  John ...................... G06F 11/0748
                                                       714/25
(Continued)

FOREIGN PATENT DOCUMENTS

KR   20110093468 A   8/2011
KR   20120046910 A   5/2012
(Continued)

OTHER PUBLICATIONS

Office Action for corresponding Korean Application No. 10-2015-0087252 dated Aug. 30, 2016.

*Primary Examiner* — Teshome Hailu
(74) *Attorney, Agent, or Firm* — Harness, Dickey & Pierce, P.L.C.

(57) ABSTRACT

Provided is a method of distributing an application including transmitting, by a distribution server, a signal for requesting metadata to a user terminal where an application is installed; receiving, by the distribution server, a reply including first metadata from the user terminal; determining, by the distribution server, whether the first metadata is valid based on second metadata corresponding to the application; setting a connection with the user terminal to re-install the application on the user terminal if the distribution server determines that the first metadata is not valid; encrypting, by the distribution server, one or more installation files that install the application with a private key; and transmitting the one or more encrypted installation files via the set connection to the user terminal.

18 Claims, 15 Drawing Sheets

(51) Int. Cl.
*H04L 29/08* (2006.01)
*G06F 21/56* (2013.01)

(58) Field of Classification Search
USPC .......................................................... 713/191
See application file for complete search history.

(56) References Cited

U.S. PATENT DOCUMENTS

| | | | | |
|---|---|---|---|---|
| 8,997,082 | B1* | 3/2015 | Bacus | G06F 17/2288 |
| | | | | 717/169 |
| 9,244,674 | B2* | 1/2016 | Waterman | G06F 8/65 |
| 9,529,586 | B1* | 12/2016 | Bacus | G06F 17/2288 |
| 2001/0051927 | A1* | 12/2001 | London | H04L 29/06 |
| | | | | 705/51 |
| 2007/0033586 | A1* | 2/2007 | Hirsave | G06F 21/51 |
| | | | | 717/174 |
| 2007/0226782 | A1* | 9/2007 | Sato | H04W 12/06 |
| | | | | 726/4 |
| 2010/0146325 | A1* | 6/2010 | John | G06F 11/0793 |
| | | | | 714/3 |
| 2011/0161949 | A1* | 6/2011 | Kodaka | G06F 8/67 |
| | | | | 717/168 |
| 2011/0202751 | A1* | 8/2011 | Kim | G06F 21/10 |
| | | | | 713/2 |
| 2012/0023490 | A1* | 1/2012 | Goebl | G06F 21/10 |
| | | | | 717/173 |
| 2015/0120804 | A1* | 4/2015 | Eschbach | H04L 43/04 |
| | | | | 709/203 |

FOREIGN PATENT DOCUMENTS

| | | |
|---|---|---|
| KR | 20130085535 A | 7/2013 |
| KR | 20130140969 A | 12/2013 |
| KR | 101410255 B1 | 6/2014 |

\* cited by examiner

METHOD OF DISTRIBUTING APPLICATION WITH SECURITY FEATURES AND METHOD OF OPERATING THE APPLICATION

CROSS-REFERENCE TO RELATED APPLICATIONS

This application claims the benefits of Korean Patent Application No. 10-2015-0047585, filed on Apr. 3, 2015 and Korean Patent Application No. 10-2015-0087252, filed on Jun. 19, 2015, in the Korean Intellectual Property Office, the disclosures of each of which are incorporated herein in their entirety by reference.

BACKGROUND

1. Field

One or more example embodiments relate to a method of distributing an application with security features, and/or a method of operating the application; and more particularly, to a method of encrypting files related to an application with a private key, storing and managing, distributing, and/or decrypting one or more downloaded files with a public key corresponding to the private key.

2. Description of the Related Art

Software is configured with an execution file installed on a PC, a dynamic link file, and a data file. In general, an execution file, a dynamic link file, and a data file, are distinguished from each other by an extension. Particularly, the execution file has an extension of EXE or COM, the dynamic link file has an extension of DLL or OCX, and the data file has an extension of DAT, INT or TXT.

When a user executes an execution file, an execution operation performs with reference to a dynamic link file or a data file that is needed to execute software. In this case, when the execution file or the dynamic link file is forged by a virus or a hacking tool, the forged file performs a different operation from a user's intention as the software is executed. The user may never recognize whether a file is infected or forged since the user believes that he or she has been using a normal program, which was used before.

A conventional method simply registers a pattern of a hacking tool by using an anti-virus engine, regularly checks processes, and then forcibly terminates a program when the program corresponds to the registered hacking pattern. However, such a security method has a limit since all the new hacking tools continuously produced have to be registered to a pattern, and the integrity of a file may no longer be detected since a pattern of a program is changed when re-compiling a conventional hacking tool or compressing an execution file.

SUMMARY

One or more example embodiments include a method of distributing a file related to an application that is not infected by a virus.

One or more example embodiments include an application that does not install and execute a file infected by a virus from among downloaded files.

One or more example embodiments include a method of distributing an application, which examines a validity of a file related to the application and may re-install an invalid file before the application is executed.

Additional aspects will be set forth in part in the description which follows and, in part, will be apparent from the description, or may be learned by practice of the presented embodiments.

According to one or more example embodiments, a method of distributing an application includes: transmitting, by a distribution server, a signal requesting metadata to a user terminal where an application is installed; receiving, by the distribution server, a reply comprising first metadata from the user terminal; determining, by the distribution server, whether the first metadata is valid based on second metadata corresponding to the application; setting a connection with the user terminal to re-install the application on the user terminal if the distribution server determines that the first metadata is not valid; encrypting, by the distribution server, one or more installation files that install the application with a private key; and transmitting the one or more encrypted installation files via the set connection, to the user terminal.

In an example embodiment, in the transmitting of the one or more encrypted installation files, the one or more encrypted installation files are compressed as a single file and then the single file is transmitted to the user terminal.

In an example embodiment, the method of distributing an application further includes encrypting, by the distribution server, one or more installation files of one or more sub-applications interfacing with a main application, storing metadata corresponding to the one or more sub-applications, and managing each sub-application.

According to one or more example embodiments, a method of distributing an application includes: transmitting, by a distribution server, a first signal requesting metadata to a user terminal where an application is installed; receiving, by the distribution server, a reply comprising first metadata, from the user terminal, in response to the first signal; determining, by the distribution server, whether the first metadata is valid based on second metadata corresponding to the application; transmitting, to the user terminal, by the distribution server, a second signal to the user terminal if the distribution server determines that the first metadata is valid, the second signal requesting a patch file corresponding to the application; receiving, by the distribution server, a reply comprising a first patch file from the user terminal, in response to the second signal; generating, by the distribution server, one or more installation files corresponding to request information based on an analysis of the request information comprised in the first patch file; setting, by the distribution server, a connection with the user terminal to transmit the one or more installation files; encrypting, by the distribution server, the one or more installation files; and transmitting the one or more encrypted installation files to the user terminal via the set connection.

In an example embodiment, in the transmitting of the one or more encrypted installation files, the one or more encrypted installation files are compressed as a single file, and then the single file is transmitted.

In an example embodiment, the method of distributing an application further includes encrypting, by the distribution server, one or more installation files of one or more sub-applications interfacing with a main application, storing metadata corresponding to the one or more sub-applications, and managing the metadata for each of the sub-applications.

According to one or more example embodiments, a method of operating an application includes: transmitting, by a user terminal, a first request requesting a patch file corresponding to a first patch file comprised in an application to an application distribution server; receiving, by the user terminal, a second patch file corresponding to the first patch file from the application distribution server, in response to the first request; determining, by the user terminal, whether the first patch file is valid based on the first patch file and the second patch file; and if the user terminal determines that the first patch file is not valid, detecting one or more error files from among execution files of the application based on the first patch file, and normalizing the one or more error files.

In an example embodiment, the normalizing of the one or more error files includes: transmitting a second request for requesting a normal file corresponding to the one or more error files to the application distribution server; receiving a first execution file corresponding to the normal file from the application distribution server, in response to the second request; decrypting the first execution file with a public key; deleting the first execution file when the first execution file is not decrypted, and executing the first execution file to execute the normal file instead of the one or more error files when the first execution file is decrypted.

In an example embodiment, in the determining whether the first patch file is valid, a unique code of the application is generated by using an encryption table in which an array is changed according to a rule, and then a validity of the first patch file is determined based on whether the unique code is the same as a unique code comprised in the first patch file.

In an example embodiment, in the transmitting the first request requesting the patch file to the application distribution server, the user terminal transmits a request for requesting a patch file corresponding to a first patch file comprised in an application to the application distribution server when a user makes an input corresponding to a starting point of executing the application.

In an example embodiment, in the determining whether the first patch file is valid, information related to the application is extracted by analyzing the first patch file, and the extracted information related to the application is compared with basic information of the second patch file to determine whether the extracted information is valid with respect to the information related to an execution.

In an example embodiment, the method of distributing an application further includes: receiving, by the distribution server, a source file of an application from a first user terminal; generating, by the distribution server, an execution file of the application by compiling the source file; setting, by the distribution server, the execution file as a distribution version of the application with version information of the execution file; and counting, by the distribution server, the number of downloads of the execution file to one or more second user terminals for each version information of the execution file, in response to a request for downloading the application received from the one or more second user terminals.

In an example embodiment, the method of distributing an application further includes: repeatedly performing the counting, and generating statistical information related to the application by analyzing a result of the counting.

In an example embodiment, in the generating of the statistical information, the total number of downloads of the application and the number of downloads of the most recent version of the application are classified into regions to generate statistical information related to the application location.

According to one or more example embodiments, an application distribution server includes: a storage unit that stores and manages by encrypting one or more installation files of one or more sub-applications interfacing with a main application with a private key; a distribution unit that transmits installation files of a sub-application and a public key corresponding to a private key, in response to a request for downloading from a user terminal; a counting unit that counts the number of transmissions of installation files of the sub-application according to the version; and a statistics generator that generates statistical information related to the application by classifying the number of counting into regions based on a location of the user terminal.

In addition, inventive concepts relate to a computer-readable recording medium storing instructions which when executed by a processor cause the processor to perform methods according to one or more example embodiments.

Aspects, features, and advantages other than those provided above will be more clarified by referring to drawings, claims, and the detailed description of the present inventive concept.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
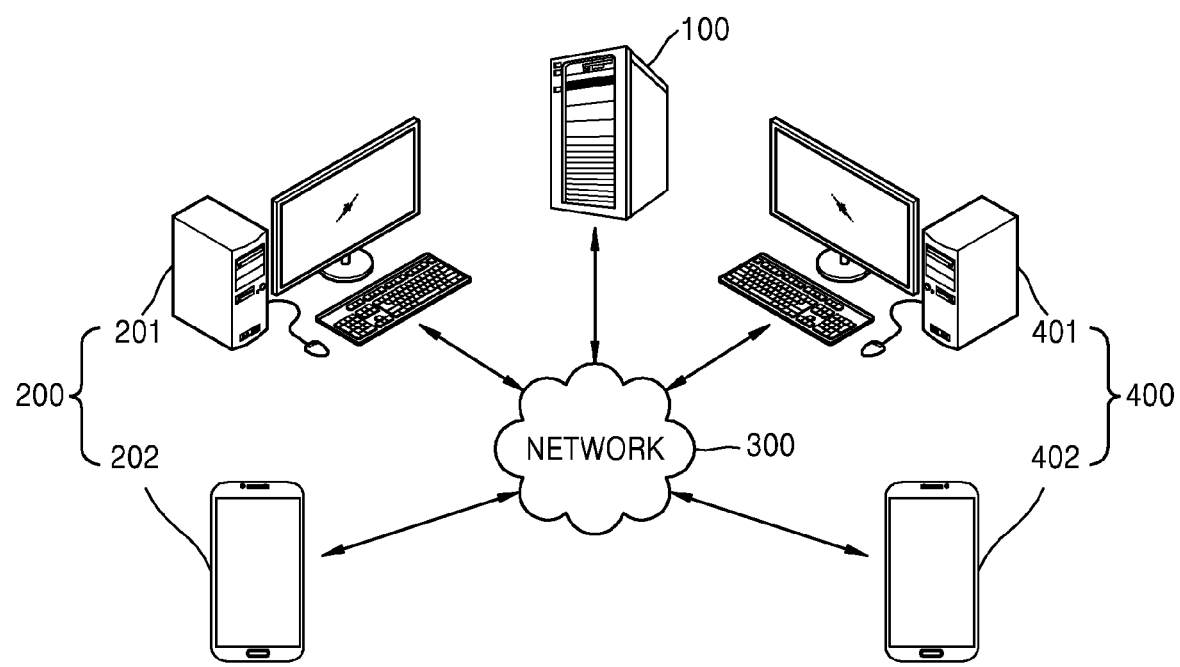
FIG. 1 illustrates a view of an application distribution system according to an embodiment of the inventive concept.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the example embodiments are merely described below, by referring to the figures, to explain aspects of the present description. As used herein, the term "and/or" includes any and all combinations of one or more of the associated listed items.

Hereinafter, the inventive concept will be described in detail by explaining preferred embodiments of the inventive concept with reference to the attached drawings. Like reference numerals in the drawings denote like elements.

While such terms as "first," "second," etc., may be used to describe various components, such components must not be limited to the above terms. The above terms are used only to distinguish one component from another.

As used herein, the singular forms "a", "an" and "the" are intended to include the plural forms as well, unless the context clearly indicates otherwise.

It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

The terms, such as 'unit' '-or/er' or 'module', should be understood as a unit that processes at least one function or operation and that may be embodied by hardware, a processor executing software, or a combination thereof.

When a certain embodiment may be implemented differently, a specific process order may be performed differently from the described order. For example, two consecutively described processes may be performed substantially at the same time or performed in an order opposite to the described order.

FIG. 1 illustrates a view of an application distribution system 10 according to an embodiment of the inventive concept.

Referring to FIG. 1, the application distribution system 10 according to an embodiment may include an application distribution server 100, user terminals (e.g., computers, smart phones, tablets, etc.) 200 and 400, and the network 300.

The application distribution server 100 may distribute one or more application installation files to the user terminals 200 and 400. Also, the application distribution server 100 may distribute an application execution file or installation file to the user terminals 200 and 400 having an application that requires an update or re-installation. In particular, the application distribution server 100 may encrypt an application installation file with a private key and then distribute the encrypted file to the user terminals 200 and 400, so that forgery of files related to the application may be prevented. The application distribution server 100 may examine whether the encrypted file is decrypted with a public key, which is shared with the user terminals 200 and 400, before installation and execution of the file in order to prevent a forged or altered file from being installed or executed.

In addition, the application distribution server 100 may receive metadata from the user terminals 200 and 400 and then analyze the metadata to determine whether an application is forged or altered, hacked, or the like. The application distribution server 100 may also receive a patch file from first user terminal 200 to detect information on a file or a region that requires a re-installation.

Also, the application distribution server 100 may receive a source file of a first application from second user terminal 400 and generate an execution file of the first application. The application distribution server 100 may include a security module examining a validity of the first application and then generate the execution file of the first application. The application distribution server 100 may count the number of times the execution file of the first application is distributed. The application distribution server 100 may manage execution files and distribution versions of one or more applications, and generate statistical data in which the number of downloads of the first application, the number of downloads of the most recent version, and a user terminal that downloads the most recent version are analyzed for each gender, job, and region. Also, the application distribution server 100 may transmit statistical data for each application to second user terminal 400 so that a user may know a rate on how many user terminals downloaded the most recent version of the application and decide whether to update the application based on the statistical data.

A user, through first user terminal 200, may download an installation file of an application from the application distribution server 100 and then execute the application. In particular, first user terminal 200 may decrypt the downloaded installation file of the application with a public key and execute only the installation file decrypted with the public key.

An administrator, through the user terminals 200 and 400, may upload a source file of an application to the application distribution server 100.

A plurality of user terminals, for example, user terminals 200 and 400, may be communication terminals using a web service through wired or wireless communication. Here, the user terminals 200 and 400 may be a personal computer 201 of a user, or a portable terminal 202 of a user. Although the portable terminal 202 in FIG. 1 is illustrated as a smart phone, the inventive concepts are not limited thereto. Although the portable terminal 202 is described as a smart phone in FIG. 1, the inventive concepts are not limited thereto. The portable terminal 202 may include any terminal having an application for browsing the worldwide web.

In detail, the user terminals 200 and 400 may include, but are not limited to, a computer (e.g., a desktop, a laptop, a tablet, or the like), a media computing platform (e.g., cable, a satellite set-top box, or a digital video recorder), a handheld computing device (e.g., a personal digital assistant (PDA), an email client, or the like), any type of hand phone, or any type of other computing or communication platforms.

The network 300 may connect the plurality of user terminals 200 and 400 to the application distribution server 100. In other words, the network 300 refers to a network through which the user terminals 200 and 400 connect with the application distribution server 100 and then transmit or receive data to or from the application distribution server 100. The network 300 may include, for example, a wired network such as Local Area Networks (LANs), Wide Area Networks (WANs), Metropolitan Area Networks (MANs), or Integrated Service Digital Networks (ISDNs) or, a wireless network such as wireless LANs, CDMA, Bluetooth, or satellite communication, but are not limited thereto.

Figure 2:
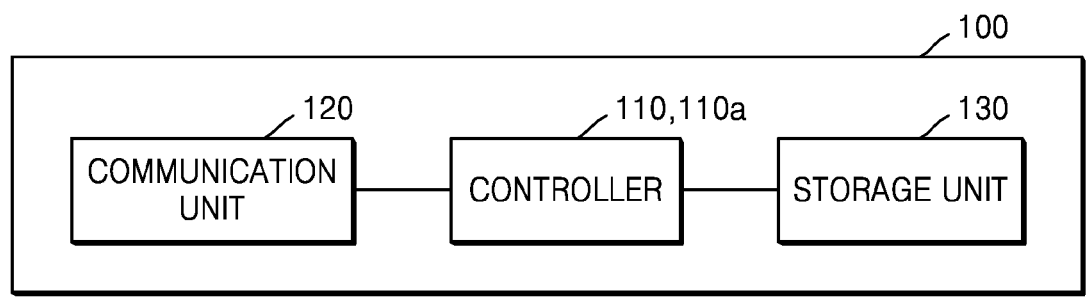
FIG. 2 illustrates a block diagram of an application distribution server according to an embodiment.

FIG. 2 illustrates a block diagram of the application distribution server 100 according to an embodiment.

Referring to FIG. 2, the application distribution server 100 may include a controller 110 or 110a, a communication unit 120, and a storage unit 130.

The controller 110 or 110a may manage files related to an application of first user terminal 200, and provide the files related to the application corresponding to a request of the first user terminal 200. The controller 110 or 110a may manage the files related to the application by encrypting the files related to the application with a private key. The controller 110 or 110a may analyze metadata and/or a patch file corresponding to the application stored in the first user terminal 200, and then determine a validity of the application and/or information on a file that is ready for re-installation.

In addition, the controller 110 or 110a may receive a source file of an application from the second user terminals 400 to generate an execution file and a distribution version of the application. The controller 110 or 110a may generate a file of the distribution version of the application in which a security module is added to the source file of the application, and count the number of downloads of the distribution version of the application. The controller 110 or 110a may generate statistical data based on the number of downloads.

The communication unit 120 may include at least one component that may connect the application distribution server 100 with the user terminals 200 and 400 to communicate each other. For example, the communication unit 120 may include a short-range communication unit and a mobile communication unit. The short-range communication unit may include, but is not limited to, a Bluetooth communication unit, a Bluetooth low energy (BLE) communication unit, a near field wireless communication unit, a WLAN (Wi-Fi) communication unit, a ZigBee communication unit, an infrared data association (IrDA) communication unit, a Wi-Fi direct (WFD) communication unit, an ultra wideband (UWB) communication unit, an Ant+ communication unit, or the like. The mobile communication unit exchanges a wireless signal with at least one of a base station, an external apparatus, and a server in a mobile communication network. Here, the wireless signal may include various types of data depending on a voice call signal, a video call signal, or a text/multimedia message transmission and reception.

The application distribution server 100 may receive, via the communication unit 120, a download request of an application installation file from the first user terminal 200, and transmit a reply in response to the request from the first user terminal 200.

The storage unit 130 may store one or more application installation files, metadata, and/or a patch file corresponding to each application, and the like. The storage unit 130 may be any computer readable media or combinations thereof. For example, computer-readable media may include magnetic media such as hard disks, floppy disks, and magnetic tape; optical media such as CD ROM disks and DVDs; magneto-optical media such as floptical disks; and hardware devices which are specially configured to store and perform program instructions, such as a read-only memory (ROM), a random access memory (RAM), a flash memory, and the like.

Figure 3:
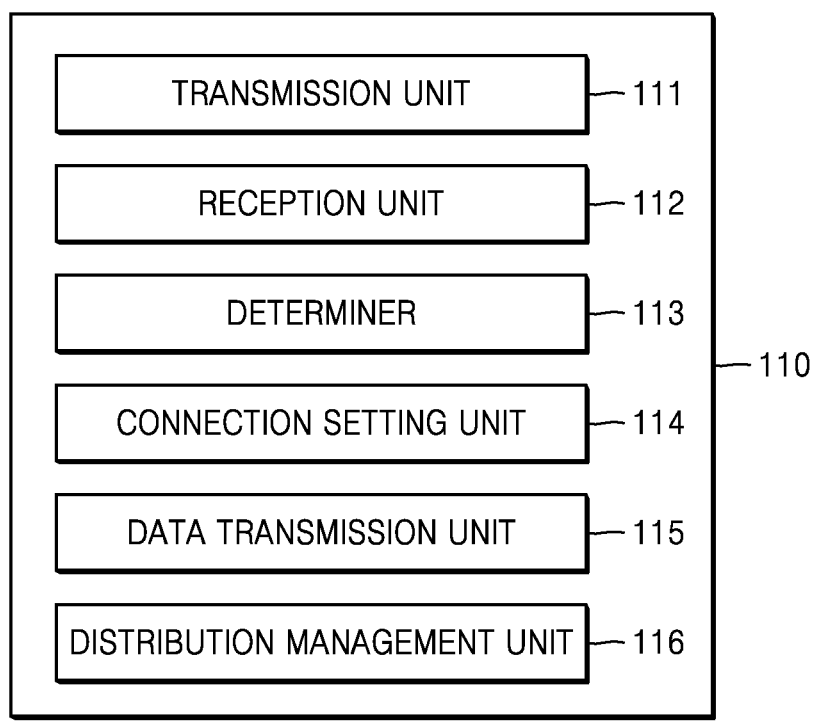
FIG. 3 illustrates a block diagram showing a structure of a controller according to an embodiment.

FIG. 3 illustrates a block diagram showing a structure of the controller 110 according to an embodiment.

Referring to FIG. 3, the controller 110 may be may be realized by hardware elements, at least one processor executing software elements, and/or combinations thereof. For example, the devices and components illustrated in the example embodiments of the inventive concepts may be implemented by processing circuitry such as a computer, a processor, an ASIC, an arithmetic logic unit (ALU), a digital signal processor, a microcomputer, a field programmable array (FPA), a programmable logic unit (PLU), a microprocessor or any device which may execute instructions and respond. A processor or like device may implement an operating system (OS) or one or software applications running on the OS. Further, the processor may access, store, manipulate, process and generate data in response to execution of software.

Software may include computer programs, codes, instructions or one or more combinations thereof and configure the controller to operate in a desired manner or independently or collectively control the processing unit. Software and/or data may be permanently or temporarily embodied in any type of machine, components, physical equipment, virtual equipment, computer storage media or units or transmitted signal waves to be interpreted by the processing unit or to provide instructions or data to the processing unit. Software may be dispersed throughout computer systems connected via networks and be stored or executed in a dispersion manner. Software and data may be recorded in one or more computer-readable storage media.

Namely, the methods according to the above-described example embodiments of the inventive concepts may be implemented with program instructions which may be executed by various processing circuitry and may be recorded in computer-readable media in or separate from the controller. The computer-readable media may also include, alone or in combination with the program instructions, data files, data structures, and the like. The program instructions recorded in the media may be designed and configured specially for the example embodiments of the inventive concepts or be known and available to those skilled in computer software. Computer-readable media may include magnetic media such as hard disks, floppy disks, and magnetic tape; optical media such as CD ROM disks and DVDs; magneto-optical media such as floptical disks; and hardware devices which are specially configured to store and perform program instructions, such as a read-only memory (ROM), a random access memory (RAM), a flash memory, and the like. Program instructions may include both machine codes, such as produced by a compiler, and higher-level language codes which may be executed by the computer using an interpreter. The described hardware devices may be configured to as one or more modules or units to perform the operations of the above-described example embodiments of the inventive concepts, or vice versa. Accordingly, the controller 110 may be configured to include a transmission unit 111, a reception unit 112, a determiner 113, a connection setting unit 114, a data transmission unit 115, and a distribution management unit 116.

The transmission unit 111 may transmit a request for requesting metadata to the first user terminal 200. Here, the metadata refers to data corresponding to an application installed on the first user terminal 200 and may include an identification code, version information, login information of a user, user information, history information of an application, and the like, which are included in a file related to the application. The identification code, the version information, the login information of a user, the user information, the history information of an application (login time, login network information, execution time, execution network information, a level of each user, levels, item possession status), or the like may be classified for each user and each application to be stored and managed separately. Here, the request may be configured according to a communication standard between the application distribution server 100 and the first user terminal 200 and, may further include code information corresponding to the requested information or an identification code of each of the first user terminal 200 that may receive the request, in order to identify the requested information.

The reception unit 112 may receive, in response to the request for requesting metadata, first metadata from the first user terminal 200.

The determiner 113 may search for second metadata corresponding to the application in the storage unit 130 and determine whether the first metadata is the same as the second metadata, to determine whether the application stored in the user terminal is valid. The determiner 113 may classify the received first metadata into a personal information region and a system region and then determine whether data stored in the personal information region is valid according to a pre-stored rule or whether data stored in the system region corresponds to system information of the second metadata corresponding to the application. For example, the determiner 113 may determine whether the number of accesses and the number of executions that are stored in the personal information region are greater than a maximum number of accesses and a maximum number of executions, respectively, and thus determine a validity of metadata. Alternatively, the determiner 113 may determine whether access network information, access time, and recent access information that are stored in the personal information region are information that already exists therein to determine a validity of metadata. Also, to examine a validity of the metadata, the determiner 113 may determine whether version information or the like stored in the system region is the same as metadata stored in the storage unit 130. The application distribution server 100 according to an embodiment may determine whether an application installed on the first user terminal 200 is valid, based on a result of determining a validity by using the determiner 113. The system area refers to the area associated with the application management (or administration) data stored therein.

If the first metadata is not valid, the connection setting unit 114 determines that the application corresponding to the first metadata is not valid, and then sets a connection with a first user terminal to re-install the application on the first user terminal 200. The connection setting unit 114 may set a connection between the first user terminal 200 and the application distribution server 100 and between the second user terminal 400 and the application distribution server 100 according to a communication protocol such as transmission control protocol/internet protocol (TCP/IP) or mobile communication.

The data transmission unit 115 may encrypt one or more installation files for installing the application with a private key, and then transmit the encrypted installation files to the first user terminal via the set connection.

In this regard, the application distribution server 100 according to an embodiment may monitor an application status of a user terminal by using metadata received from the user terminal, and transmit, to the first user terminal 200, an installation file to re-install an application that is hacked, forged, or the like. Also, the application distribution server 100 according to an embodiment may store and manage the files related to the application and encrypted with the private key, and thus prevent damaged files related to the application from being transmitted to the user terminal wherein the application may be damaged by malicious code or hacking.

In some embodiments, the data transmission unit 115 may compress one or more installation files for re-installing an application of a user terminal into a single compressed file, and then transmit the single compressed file to the first user terminal 200. When the data transmission unit 115 compresses one or more installation files into a single compressed file, the compressed file may be transmitted in a single connection to the first user terminal 200. As a result, the application distribution server 100 according to an embodiment may transmit, to a first user terminal 200, an installation file of an application in one connection even when a network environment including the Internet is not favorable.

The distribution management unit 116 may receive a source file of the application from the second user terminals 400, and generate and distribute a distribution file of the application corresponding to the source file. In particular, the distribution management unit 116 may count the number of distributions or transmissions to one or more user terminals, and thus manage the total number of downloads, the number of downloads for an execution file of a recent version, or the like. A structure of the distribution management unit 116 will be described in detail with reference to FIG. 13.

Figure 4:
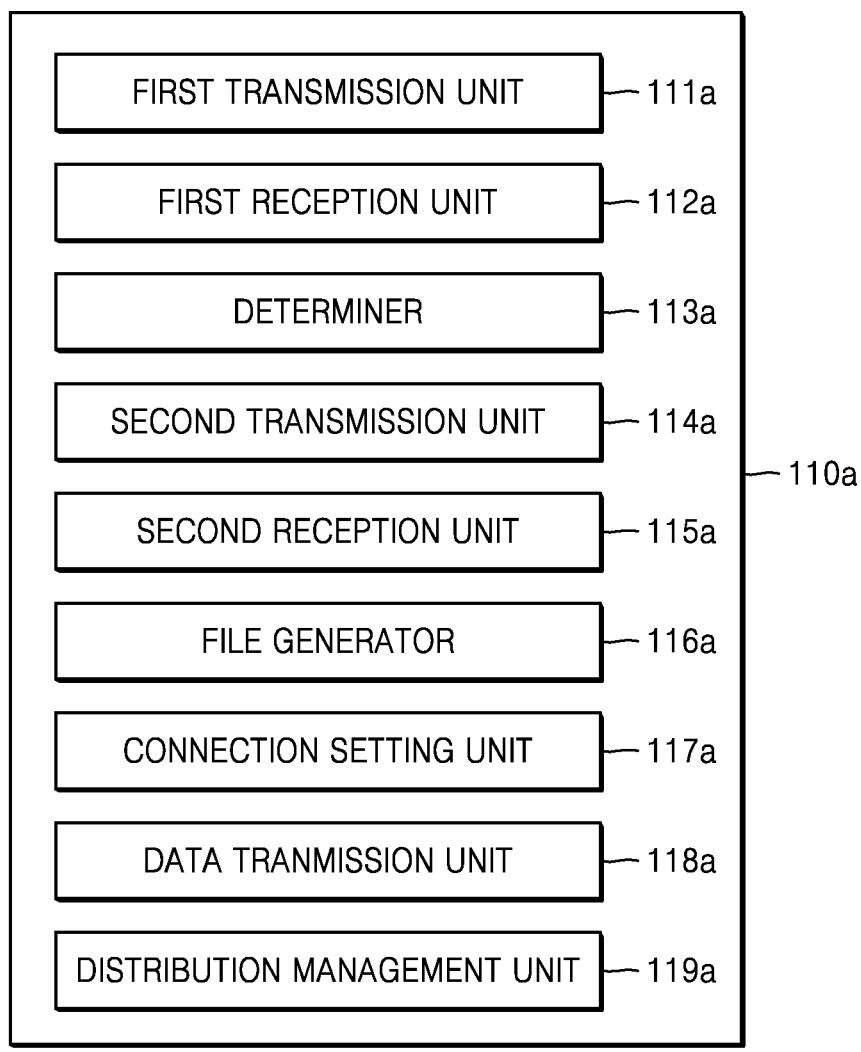
FIG. 4 illustrates a block diagram showing a structure of a controller according to another embodiment.

FIG. 4 illustrates a block diagram showing a structure of a controller 110a according to another embodiment.

Referring to FIG. 4, the controller 110a may be embodied or implemented in the same manner as controller 110 described above. Accordingly, the controller 110a may be configured to include a first transmission unit 111a, a first reception unit 112a, a determiner 113a, a second transmission unit 114a, a second reception unit 115a, a file generator 116a, a connection setting unit 117a, a data transmission unit 118a, and a distribution management unit 119a.

The first transmission unit 111a may transmit a first signal for requesting metadata to a user terminal where an application is installed.

The first reception unit 112a may receive, in response to the first signal, a reply including first metadata from the user terminal. Here, the first metadata may include hash value or a data bit that corresponds to the application of one or more executable files. If there is a process such as updating, writing, reading, and correction of each file, the data bits are increased or decreased.

The determiner 113a searches for second metadata corresponding to the application, and determines whether the first metadata is the same as the second metadata, to determine whether the first metadata is valid. Here, an operation of the determiner 113a is the same as that of the determiner 113, and thus detailed descriptions will not be repeated.

If the first metadata is not valid based on a result of the determination above, the second transmission unit 114a may transmit, to the user terminal, a second signal for requesting a patch file corresponding to the application. Here, the first signal or the second signal are configured according to a communication standard between the application distribution server 100 and a first user terminal 200, and may further include code information corresponding to the requested information or an identification code of the first user terminal 200 that may receive the first and second signals, in order to identify the requested information.

The second reception unit 115a may receive a reply including a first patch file from the user terminal, in response to the second signal. Here, the patch file is one of files that are installed in relation to the application, and may be implemented to perform a function for managing a mounting application. The patch file may also be implemented to perform the function of preventing the forgery of an application. In particular, the patch file may include data indicating the effectiveness of one or more of the executable applications. The data may be assigned to each of the one or more files containing the data area or the data bit to the application's executable file.

The file generator 116a may generate an installation file that installs the whole or part of the application installed on the user terminal by analyzing the first patch file. The file generator 116a may create a setup file, which is configured to create all or part of the application, and perform installation, based on a data area and a data bit included in the first patch file. The file generator 116a may generate an installation file that installs the whole or part of the application installed on the user terminal by analyzing a data bit included the first patch file. The file generator 116a may generate an installation file that installs the whole or part of the application installed on the user terminal by analyzing a hash value included the first patch file.

The file generator 116a may analyze a request information included in the first patch file, and thus generate an installation file that installs all of some of the application. Here, the request information may include information that is forged or modulated, and re-installation is required corresponding to the one or more files. The file generator 116a may generate an installation file for installing part of the application, which is different from the conventional installation file that only installs a whole application. The application distribution server 100 according to the control by a user of the first terminal 200 of the patch file may generate the setup file. The patch file of the first user terminal 200 is implemented to re-install the applications. In some embodiments, the file generator 116a may generate a single installation file for installing a plurality of applications. In other words, when a main application and a sub-application interfacing with the main application are installed, the file generator 116a may generate an installation file including a first installation file for installing the main application and a second installation file for installing the sub-application.

The connection setting unit 117a may set a connection with a user terminal to transmit the generated installation file to the first user terminal 200. The operation of the connection setting unit 117a is the same as that of the connection setting unit 114, and a description thereof will be omitted.

The data transmission unit 118a may encrypt an installation file and transmit the encrypted installation file to a first user terminal 200. As a result, the application distribution server 100 according to an embodiment may monitor an installation file of an application after the installation file is distributed, monitor a risk that occurs in the installation file (execution file) or the like, remove the installation file (execution file) or the like that is exposed to a risk from a user terminal, and control the data transmission unit 118a to re-install the application on the first user terminal 200.

The distribution management unit 119a may receive a source file of an application from the second user terminal 400, and generate and distribute a distribution file of the application corresponding to the source file. In particular, the distribution management unit 119a may count the number of distributions or transmissions to one or more user terminals, and thus manage the total number of downloads, the number of downloads for an execution file of a recent version, or the like. A structure of the distribution management unit 119a will be described in detail with reference to FIG. 13.

The application distribution server 100 according to an embodiment may transmit an installation file for installing a whole application, or may generate and transmit to a first user terminal 200, an installation file for installing part of an application, or may generate and transmit an installation file for installing a plurality of applications by analyzing a patch file received from a user terminal.

Figure 5:
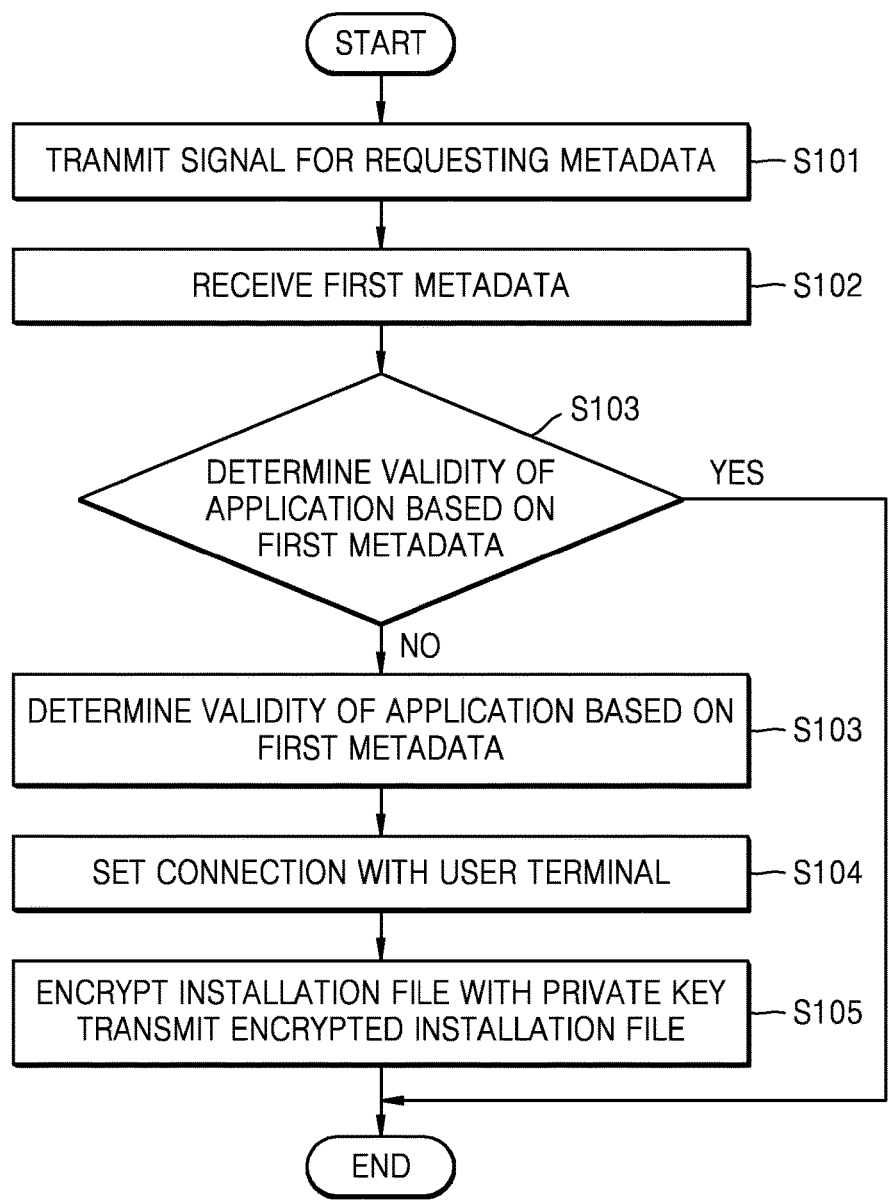
FIG. 5 illustrates a flowchart showing a method of distributing an application, according to an embodiment.

FIG. 5 illustrates a flowchart showing a method of distributing an application, according to an embodiment.

In operation S101, the application distribution server 100 may transmit a first signal for requesting metadata to a user terminal where an application installed.

In operation S102, the application distribution server 100 may receive first metadata from the user terminal, in response to the first signal for requesting the metadata.

In operation S103, the application distribution server 100 may search for second metadata corresponding to the application in the storage unit 130, and determines whether the first metadata is the same as the second metadata to determine a validity of the application stored in the user terminal. The application distribution server 100 may classify the received first metadata into a personal information region and a system region, and then determine whether data stored in the personal information region is valid according to a rule (e.g., a pre-stored rule), or whether data stored in the system region corresponds to system information of the second metadata corresponding to the application.

In operation S104, if the first metadata is not valid, the application distribution server 100 determines that the application corresponding to the first metadata is not valid, and then sets connection with the user terminal to re-install the application. The application distribution server 100 may set a connection between the first user terminal 200 and the application distribution server 100 according to a communication protocol such as TCP/IP, or mobile communication.

In operation S105, the application distribution server 100 encrypts one or more installation files for installing the application with a private key, and then transmits the encrypted installation files to the first user terminal 200 via the set connection.

Figure 6:
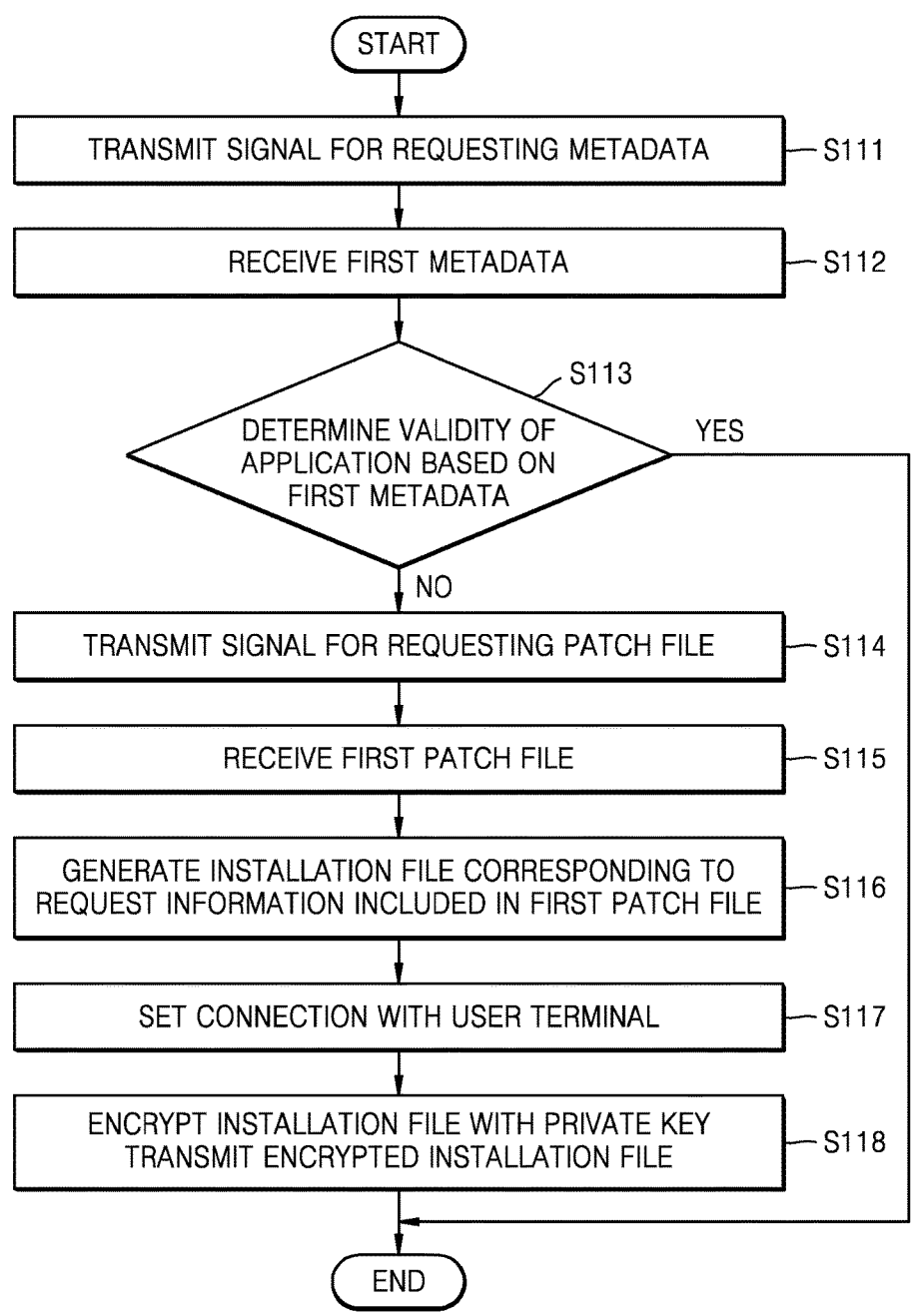
FIG. 6 illustrates a flowchart showing a method of distributing an application, according to another embodiment.

FIG. 6 illustrates a flowchart showing a method of distributing an application, according to another embodiment.

In operation S111, the application distribution server 100 may transmit a first signal for requesting metadata to a user terminal where an application is installed.

In operation S112, the application distribution server 100 may receive a reply including first metadata from the user terminal, in response to the first signal.

In operation S113, the application distribution server 100 may search for a second metadata corresponding to the application and determine whether the first metadata is the same as the second metadata to determine a validity of the first metadata. This operation may be the same as described in previous embodiments.

In operation S114, if the first metadata is not valid based on a result of the determination above, the application distribution server 100 may transmit, to the user terminal, a second signal for requesting a patch file corresponding to the application.

In operation S115, the application distribution server 100 may receive a reply including a first patch file from the user terminal, in response to the second signal.

In operation S116, the application distribution server 100 may analyze the first patch file, and thus generate an installation file that installs the whole of part of the application installed on the user terminal. The application distribution server 100 may analyze request information included in the first patch file and thus, generate an installation file installing the whole or part of the application. The application distribution server 100 may generate an installation file that may re-install part of an application and is different from the conventional installation file that installs a whole application.

In operation S117, the application distribution server 100 may set a connection with the user terminal to transmit the generated installation file to the first user terminal 200.

In operation S118, the application distribution server 100 may encrypt the installation file so as to transmit the encrypted installation file to the user terminal.

Figure 7:
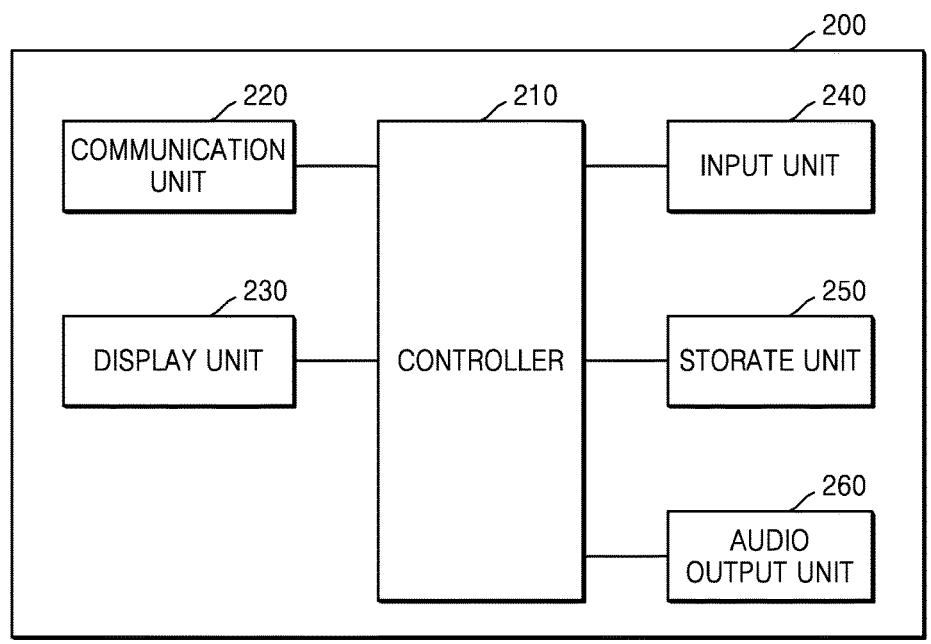
FIG. 7 illustrates a block diagram showing a structure of a user terminal according to an embodiment.

FIG. 7 illustrates a block diagram showing a structure of a user terminal according to an embodiment.

Referring to FIG. 7, the user terminal 200 may include a controller 210, a communication unit 220, a display unit 230, an input unit 240, a storage unit 250, and an audio output unit 260.

The controller 210 may manage an application, which needs to be re-installed on the first user terminal 200, from among one or more applications installed on the first user terminal 200 via one or more patch files that separately and individually manage the one or more applications. Also, the controller 210 may control the first user terminal 200 to install an installation file thereon, that may be decrypted with a public key received from the application distribution server 100 so that an invalid application is not installed on the first user terminal 200. In addition, the controller 210 may store and manage a patch file monitoring an execution file of the application in order to prevent alteration of the installed application.

The communication unit 220 may include at least one component by which the communication unit 220 may communicate with the application distribution server 100. For example, the communication unit 220 may include a short-range communication unit and a mobile communication unit. The short-range communication unit may include, but is not limited to, a Bluetooth communication unit, a Bluetooth low energy (BLE) communication unit, a near field wireless communication unit, a Wi-Fi communication unit, a ZigBee communication unit, an IrDA communication unit, a WFD communication unit, a UWB communication unit, an Ant+ communication unit, or the like. The mobile communication unit exchanges a wireless signal with at least one of a base station, an external apparatus, and a server in a mobile communication network. Here, the wireless signal may include various types of data depending on a voice call signal, a video call signal, or a text/multimedia message transmission and reception.

The display unit 230 may display a download of an installation file of an application, an installation of an application, an execution screen of an application, and a user interface. The display unit 230 may display on a screen depending on a user event input through the input unit 240. When the display unit 230 and a touch pad form a mutual layer structure and then are formed as a touch screen, the display unit 230 may be used as both an output device and input device. The display unit 230 may include at least one selected from a liquid crystal display, a thin film transistor-liquid crystal display, an organic light-emitting diode display, a flexible display, a 3D display, and an electrophoretic display.

The input unit 240 refers to a unit for inputting an event or data so that a user controls a user terminal. For example, the input unit 240 may be, but is not limited to, a key pad, a dome switch, a touch pad (Capacitive Overlay, Resistive Overlay, Infrared Beam, Surface Acoustic Wave, Integral Strain Gauge, piezo Electric, or the like), a jog wheel, a jog switch, or touch screen integrated with the display unit 230.

The input unit 240 may receive an input requesting a download and an installation of an installation file of an application, or the like.

The storage unit 250 may store and manage files received from the communication unit 220. In particular, the storage unit 250 may store and manage a public key for installing an application.

The audio output unit 260 may output audio files obtained through the communication unit 220. Also, the audio output unit 260 may output an audio signal related to functions performed by the user terminal 200. The audio output unit 260 may include a speaker, a buzzer, a vibration motor, or the like. The vibration motor may output a vibration signal. For example, the vibration motor may output a vibration signal corresponding to an output of audio data or image data. In addition, the vibration motor may output a vibration signal when a touch screen receives a touch input.

Figure 8:
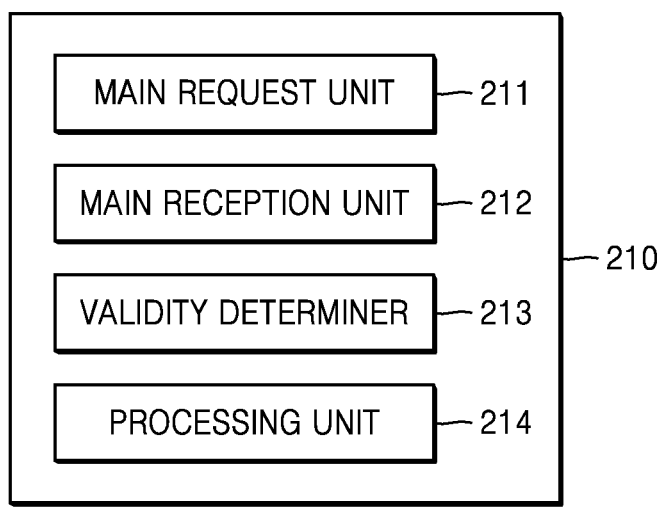
FIG. 8 illustrates a block diagram showing a structure of a controller.

FIG. 8 illustrates a block diagram showing a structure of the controller 210.

Referring to FIG. 8, the controller 210 may embodied or implemented in the same manner as controller 110 described above. Accordingly, the controller 210 may be configured to include a main request unit 211, a main reception unit 212, a validity determiner 213, and a processing unit 214.

The main request unit 211 may transmit to the application distribution server 100 a request for requesting a patch file corresponding to a first patch file included in an application. Here, the request is configured according to a communication standard transmitted to the application distribution server 100, and may further include request information corresponding to an identification code and/or a patch file of the application to identify information requested.

The main reception unit 212 may receive a second patch file corresponding to the first patch file from the application distribution server 100, in response to the request.

The validity determiner 213 may determine whether the application is valid by comparing the first patch file with the second patch file. The validity determiner 213 determines that the first patch file is valid if the level of similarity between the first patch file and the second patch file is equal to or greater than a desired (or, alternatively a pre-set) threshold information and determines that the first patch is not valid if the level of similarity therebetween is less than the desired or pre-set threshold information.

In another embodiment, the validity determiner 213 may generate a unique code of the application by using an encryption table in which an array is changed according to a pre-set rule, and determine whether the unique code is the same as a unique code included in the first patch file to determine a validity of the first patch file. By using an encryption table in which an array is changed, internal alterations due to hacking attempts or malicious code may be prevented. Here, the desired or pre-set rule may be differently set for each of a program, an operating system, a user terminal, and a download period. The desired or pre-set rule may be received once from the application distribution server 100 when first downloading the application, or be already assigned to user terminals included in a specific group. Here, the unique code is a value included in some files of the application in order to check the integrity of the application, and may be generated based on a value such as a phone number of the user terminal, a serial number of the user terminal, a time when a download is requested, or an ID of the user terminal. The application distribution server 100 according to an embodiment may transmit the unique code to the user terminal when a distribution version of the application is distributed, or may receive the unique code together with an installation-completion signal of the application from the user terminal, wherein the unique code is generated by the user terminal where the application is installed. Here, the installation-completion signal of the application is a signal received from a user terminal where an installation of an application is completed so as to confirm whether the application is installed on the user terminal.

If the first patch file is not valid, the processing unit 214 may detect one or more error files, of which the whole or part are altered, from among execution files of the application based on the first patch file, and then perform a normalization function on the error files. The normalization function of the processing unit 214 for normalizing the error files will be described in detail with reference to FIG. 9.

In this regard, the user terminals 200 and 400 according to an embodiment may determine whether a downloaded file is an encrypted file with a private key corresponding to a stored public key, and thus prevent execution and installation of a file from a wrong source. Also, the user terminals 200 and 400 according to an embodiment may prevent a forged file from being executed, thereby eliminating a virus infection risk caused by malware and hacking attempts.

Figure 9:
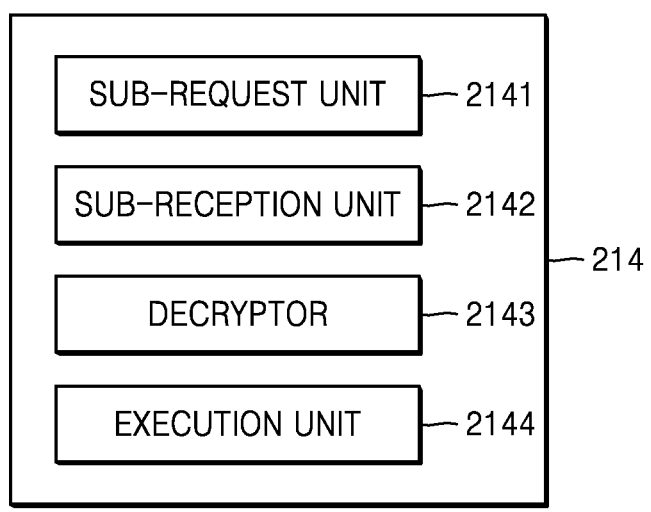
FIG. 9 illustrates a block diagram showing a structure of a processing unit.

FIG. 9 illustrates a block diagram showing a structure of the processing unit 214.

Referring to FIG. 9, the processing unit 214 may include a sub-request unit 2141, a sub-reception unit 2142, a decryptor 2143, and an execution unit 2144.

The sub-request unit 2141 may transmit a request for requesting a normal file corresponding to an error file to the application distribution server 100.

The sub-reception unit 2142 may receive, in response to the request, a first execution file corresponding to the normal file from the application distribution server 100.

The decryptor 2143 may decrypt the first execution file with a public key. Here, the public key corresponds to a private key of the application distribution server 100; and data encrypted by the application distribution server 100 is decrypted with the public key.

The execution unit 2144 may delete the first execution file when the first execution file is not decrypted. However, the execution unit 2144 may execute the first execution file to execute the normal file instead of the error file when the first execution file is decrypted.

Figure 10:
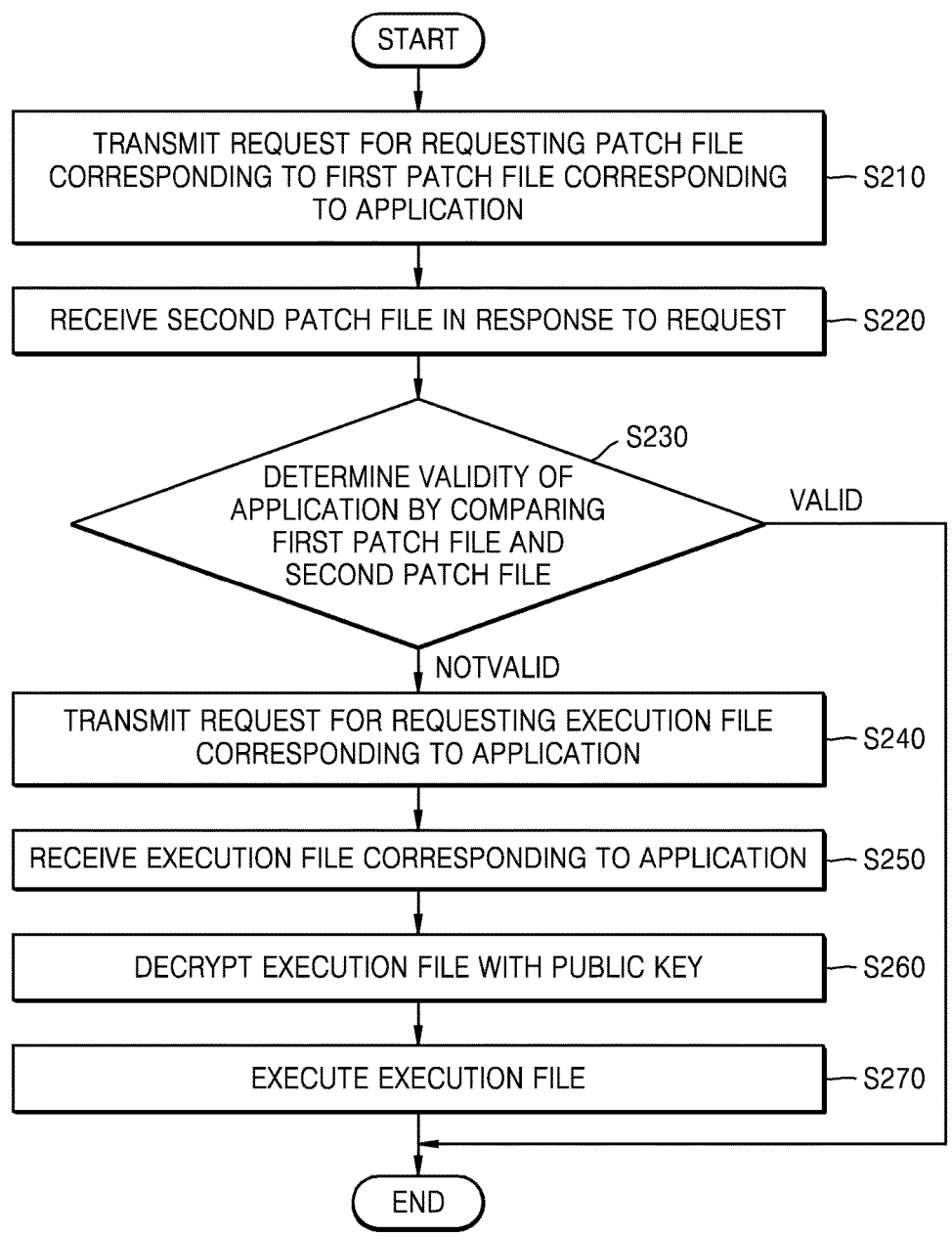
FIG. 10 illustrates a flowchart describing a method of operating an application, according to an embodiment.

FIG. 10 illustrates a flowchart describing a method of operating an application, according to an embodiment.

In operation S210, the user terminal 200 may transmit to the application distribution server 100 a request for requesting a patch file corresponding to a first patch file included in an application.

In operation S220, the user terminal 200 may receive, in response to the request, a second patch file corresponding to the first patch file from the application distribution server 100.

In operation S230, the user terminal 200 may determine whether the application is valid by comparing the first patch file with the second patch file. If a level of similarity between the first patch file and the second patch file is equal to or greater than a desired or pre-set threshold information, the user terminal 200 determines that the first patch file is valid; otherwise, the user terminal 200 determines that the first patch file is not valid. Here, the validity of the first patch file may correspond to a validity of the application.

If not valid, in operation S240, the user terminal 200 may transmit to the application distribution server 100 a request for requesting a normal file corresponding to an error file. Here, the normal file refers to the whole or part of an execution file included in the application and valid files of the application.

In operation S250, the user terminal 200 may receive, in response to the request, a first execution file corresponding to the normal file from the application distribution server 100.

In operation S260, the user terminal 200 may decrypt the first execution file with a public key. Here, the public key corresponds to a private key of the application distribution server 100 and data encrypted by the application distribution server 100 is decrypted with the public key.

In operation S270, the user terminal 200 may delete the first execution file when the first execution file is not decrypted. However, the user terminal 200 may execute the first execution file to execute the normal file instead of the error file when the first execution file is decrypted.

Figure 11:
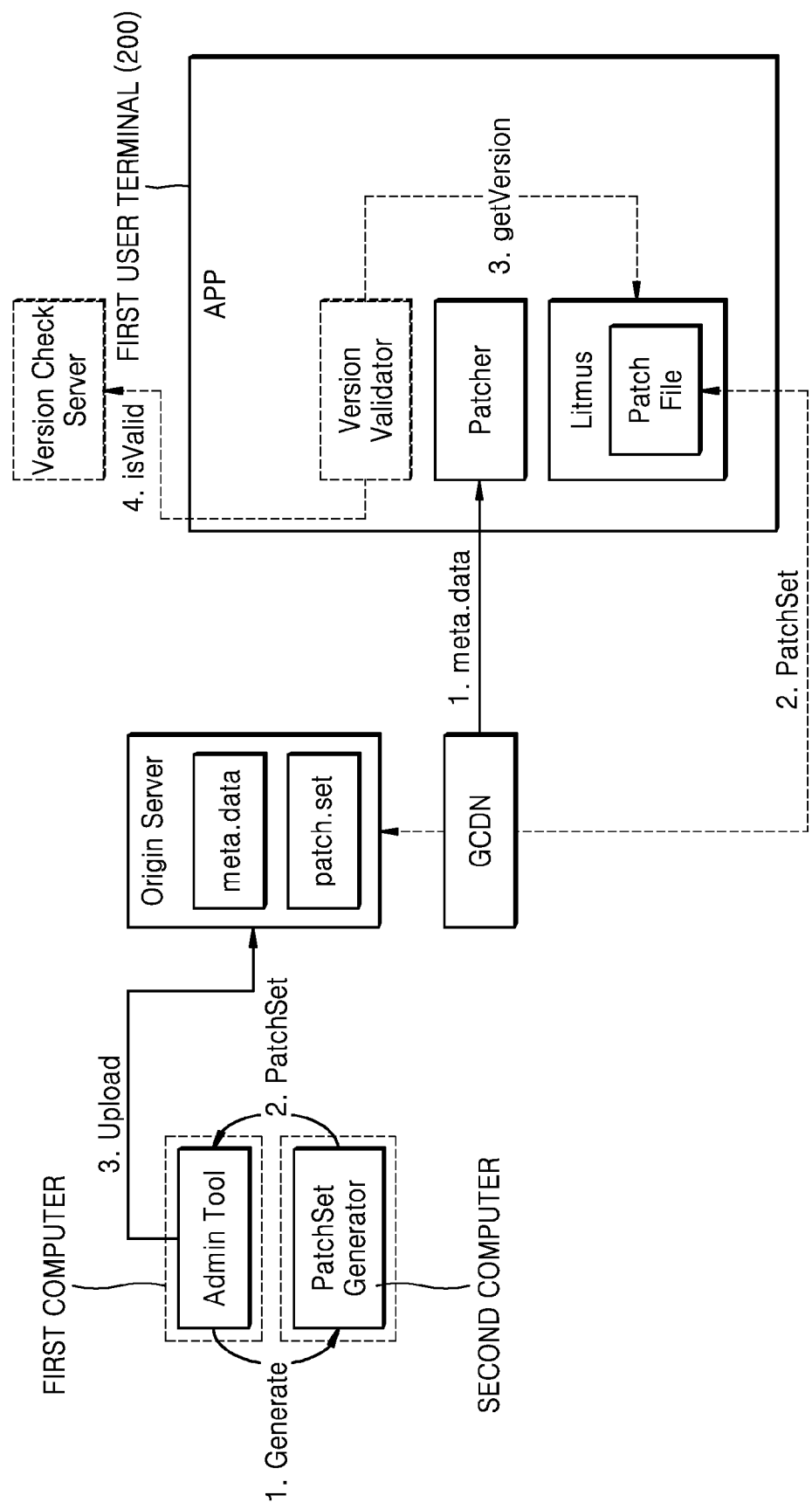
FIG. 11 illustrates a view showing a flow of data in an application distribution system, according to an embodiment.

FIG. 11 illustrates a view showing a flow of data in an application distribution system, according to an embodiment.

As illustrated in FIG. 11, the application distribution system may include an Admin Tool executing on a first computer or processor, a PatchSet Generator executing on a second computer or processor, an Origin Server, a GCDN, and a first user terminal.

The Admin Tool is different from an application distribution server 100 and stores and manages a PatchSet file included in an installation or execution file of an application. The Admin Tool may transmit to the PatchSet Generator a request (1) for generating a PatchSet file to be included in an installation file or execution file of an application. Here, the PatchSet Generator generates a PatchSet file to be included in an execution file or installation file of an application, and, although illustrated as in a separate device from the Admin Tool, the PatchSet Generator may be included in the Admin Tool. In response to the request, the PatchSet Generator generates the PatchSet file (2) to transmit the PatchSet file (2) to the Admin Tool. Here, the PatchSet file is generated based on the installation or execution file of the application, and may be configured in a form and context to correspond to a schematic structure of the installation or execution file of the application, information on the application (date of creation, path information, version, operating system, or the like), information on an application creator, or the like. In other words, the PatchSet file is generated to correspond to an installation or execution file of an application at first, and continuously generated and updated while corresponding to the installation or execution file.

The Admin Tool may upload the generated PatchSet file (3) to the Origin Server. Here, the Origin Server stores and manages an execution file or installation file of an application, and, in response to a request from a user terminal, provides an execution file or installation file. The Admin Tool also receives an execution file or installation file of an application from a second user terminal 400. In particular, the Origin Server according to an embodiment may also add the PatchSet file received from the Admin Tool to an installation or execution file of an application. The application distribution system according to an embodiment is a system in which an execution files or installation file of an application is distributed, and may include the Origin Server and the GCDN. As illustrated in FIG. 11, the Origin Server and the GCDN are separately and independently provided. However, alternatively, the Origin Server and the GCDN may be included in a single device. The GCDN may distribute an installation or execution file of an application, receive files to be distributed from the Origin Server, and transmit the files to a user terminal in response to a request from the user terminal.

The first user terminal 200 installs or executes the received installation file or execution file, and during the execution, a patch file (PatchSet file) included in the installation or execution file of the application is stored and executed. In particular, the user terminal may include a Patcher for managing a patch file (PatchSet file). The Patcher may receive metadata and a PatchSet file from the GCDN, and independently determine whether re-installation or update of the installed application is needed by analyzing the similarity or difference between the received files and stored files. Here, Litmus is an application related to the security. Litmus can be independent or contained in the executed application is executed.

Figure 12:
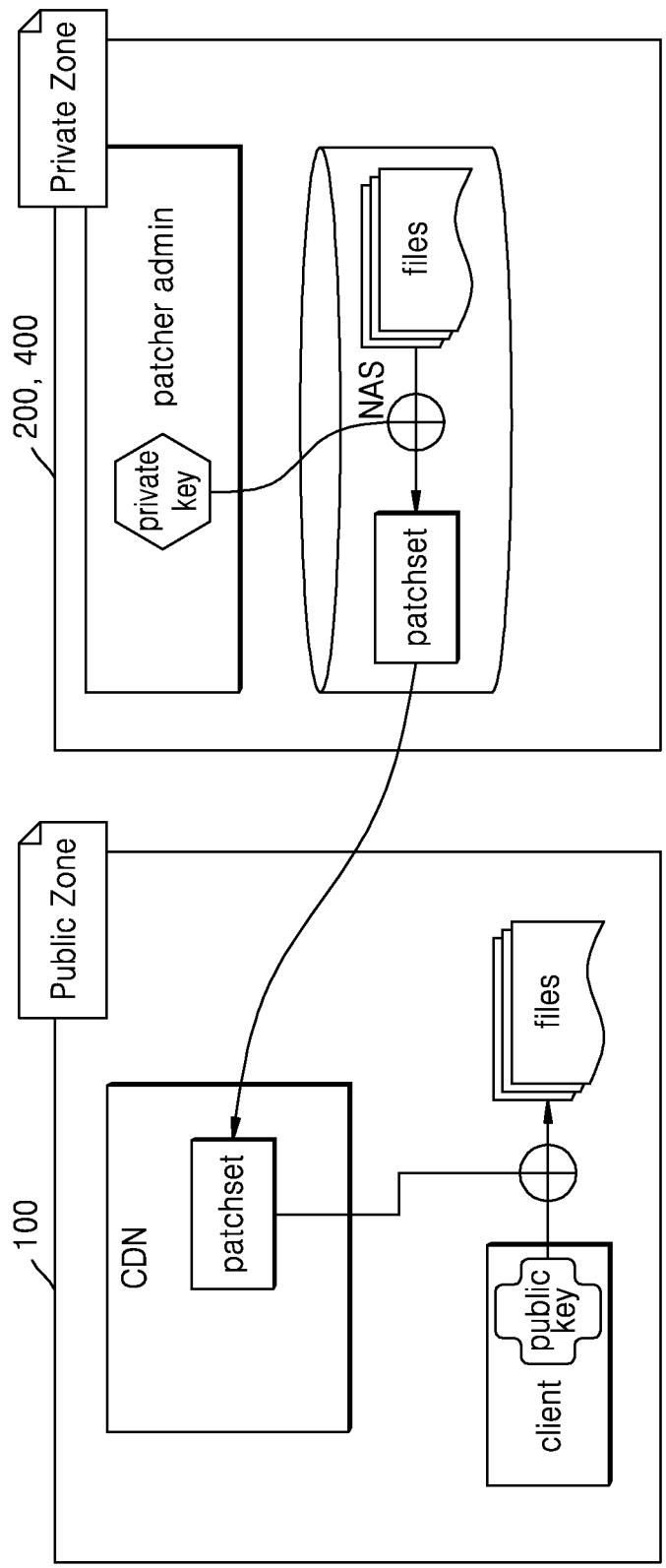
FIG. 12 is a view showing an encryption or decryption of a file between a user terminal and the application distribution server.

FIG. 12 is a view showing an encryption or decryption of a file between a user terminal and the application distribution server 100.

As illustrated in FIG. 12, the application distribution server 100 encrypts a PatchSet file with a public key before the PatchSet file is distributed, and the user terminal decrypts a downloaded file (installation file, execution file, PatchSet file, etc.) with a private key stored previously. The user terminal 200 may not install or execute a file that is not decrypted, and thus a file exposed to a risk of forgery, malicious code, virus, or the like may be prevented from being executed.

Figure 13:
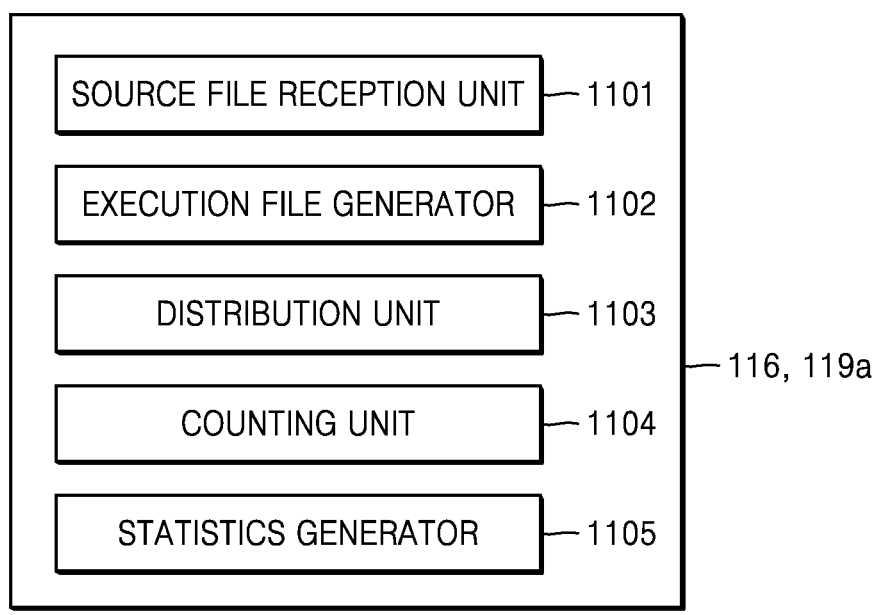
FIG. 13 is a view showing a structure of a distribution management unit of FIGS. 3 and 4.

FIG. 13 is a view showing a structure of the distribution management unit 116 or 119a of FIGS. 3 and 4.

The distribution management unit 116 or 119a may include a source file reception unit 1101, an execution file generator 1102, a distribution unit 1103, a counting unit 1104, and a statistics generator 1105.

The source file reception unit 1101 may receive a source file of a desired (or, alternatively a predetermined) application from a first user terminal. The source file reception unit 1101 may sequentially receive source files of an application, and may also receive source files of an application at once as a compressed file. In a case of the compressed file, the source file reception unit 1101 decompresses the compressed file received from the first user terminal.

The execution file generator 1102 may generate an execution file of the application by compiling the source file. Here, the compiling refers to translating a programming language (a high-level language such as COBOL, FORTRAN, or C) into machine language (computer language) and is performed by a program, such as a compiler. In other words, the execution file generator 1102 may include a compiler.

The distribution unit 1103 may set the execution file as a distribution version of the application together with version information of the execution file. A distribution version previously set as the distribution version (hereinafter, the previous distribution version) is added to a history of distribution versions, and a distribution version including a newly generated execution file (hereinafter, the most recent distribution version) is set as the most recent distribution version. The distribution unit 1103 may generate a distribution version including a compiled execution file, version information of the execution file, a public key of the execution file, or the like, and then register the distribution version as the most recent version of the application. The distribution version registered and set by the distribution unit 1103 may be transmitted to a first user terminal 200 in response to a request for downloading a received application.

The counting unit 1104 may count, in response to the request from one or more second user terminals for downloading the application, the number of transmissions of an execution file of the application to the one or more first user terminal 200 for each version information of the execution file. The counting unit 1104 may not count when an identical version is transmitted to an identical user terminal. For example, when an execution file of 1.0.1 version of a first application is transmitted to the second user terminal 400, the counting unit 1104 may increase by 1 the number of transmissions of the 1.0.1 version of the first application, and also increase by 1 the total number of transmissions of the first application.

The statistics generator 1105 may generate statistical information related to the application by analyzing a result of the counting by the counting unit 1104. Here, the statistical information may include the total number of downloads of an application, the number of downloads of the most recent version of an application, and data in which the number of downloads are classified into regions.

For example, the counting unit 1104 may count the number of downloads of a first application in a cumulative manner, regardless of a user terminal and a version and then may calculate the total number of downloads. The counting unit 1104 may calculate the number of downloads of the most recent version of a first application. When a new source file is registered by or received from a second user terminal 400, the number of downloads of the most recent version of an application is set to 0, and the counting unit 1104 counts the number of downloads of the most recent version starting from 0. In addition, the counting unit 1104 may receive location information detected by a sensor included in the user terminals 200 and 400, or detect a location of the user terminals 200 and 400 by using network environment information of the user terminals 200 and 400. The counting unit 1104 may calculate the number of downloads for each region by using location information of the user terminals 200 and 400.

The application distribution server 100 according to an embodiment may transmit statistical data corresponding to an application to a terminal of a developer or administrator of the application. Based on the statistical data, the developer or administrator of the application may transmit a signal to the second user terminal 400 for requesting the most resent version of the application when the most recent version of the application has not been downloaded to the first user terminal 200. In this regard, the application distribution server 100 according to an embodiment may control number of downloads of the latest applications to upgrade an execution file of a distributed application to the most recent version.

In addition, when a rate, which shows the percentage of how many users downloaded the first application to upgrade to the most recent version, reaches 100 percent, information on such upgrades to the most recent version is transmitted to a developer or administrator of the first application, and thus the developer or administrator may only take into account a source file of the most recent version without taking into account a previous version when generating a source file of the first application, that is, developing the first application.

Figure 14:
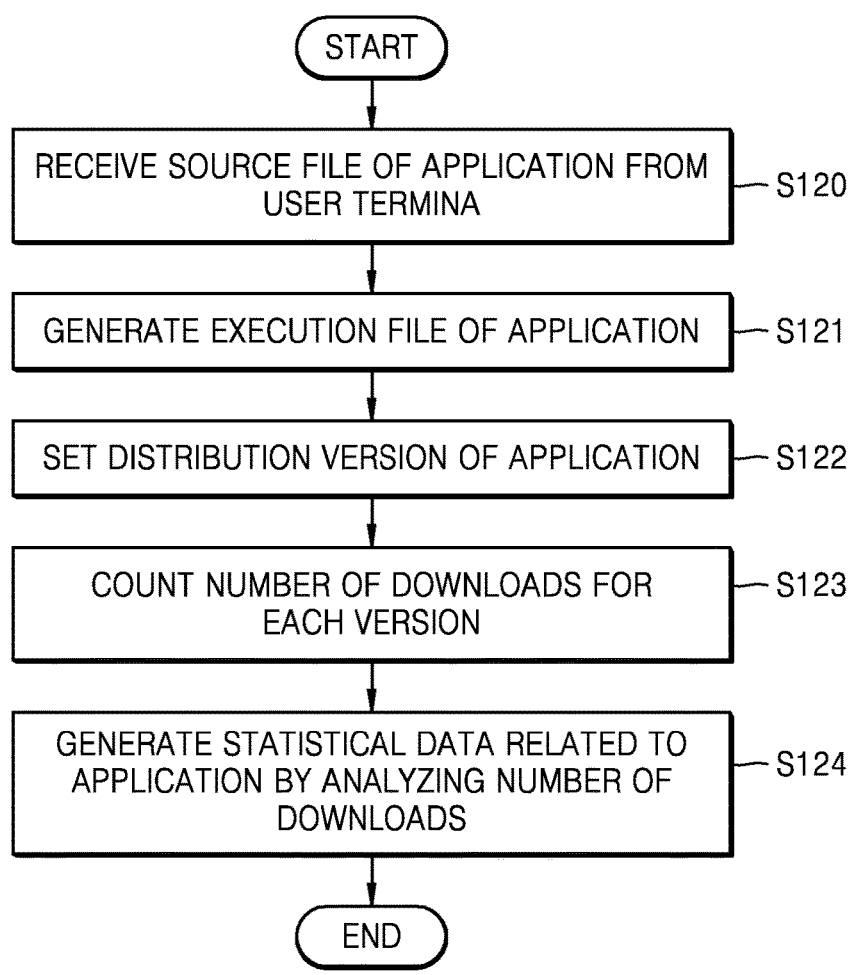
FIG. 14 is a flowchart showing a method of distributing an application, according to another embodiment.

FIG. 14 is a flowchart showing a method of distributing an application, according to another embodiment.

Referring to FIG. 14, a method of distributing an application according to another embodiment may include receiving a source file from a second user terminal (S120), generating an execution file (S121), setting a distribution version (S122), counting the number of downloads (S123), and generating statistical data (S124).

In operation S120, the application distribution server 100 may receive a source file of a desired (or, alternatively a predetermined) application from a second user terminal 400. Operations in operation S120 are the same as those in the source file reception unit 1101, and thus detailed descriptions thereof will be omitted.

In operation S121, the application distribution server 100 may generate an execution file of the a desired (or, alternatively a predetermined) application by compiling the source file. Operations in operation S121 are the same as those in the execution file generator 1102, and thus detailed descriptions thereof will be omitted.

In operation S122, the application distribution server 100 may set the execution file as a distribution version of the a desired (or, alternatively a predetermined) application with version information of the execution file. Operations in operation S122 are the same as those in the distribution unit 1103, and thus detailed descriptions thereof will be omitted.

In operation S123, the application distribution server 100 may count the number of transmissions of the execution file of the a desired (or, alternatively a predetermined) application to one or more first user terminal 200 for each version information of the execution file, in response to a request for downloading the predetermined application received from one or more first user terminal 200. Operations in operation S123 are the same as those in the counting unit 1104, and thus detailed descriptions thereof will be omitted.

In operation S124, the application distribution server 100 may generate statistical data related to the a desired (or, alternatively a predetermined) application by analyzing a result of the counting. Operations in operation S124 are the same as those in the statistics generator 1105, and thus detailed descriptions thereof will be omitted.

Figure 15:
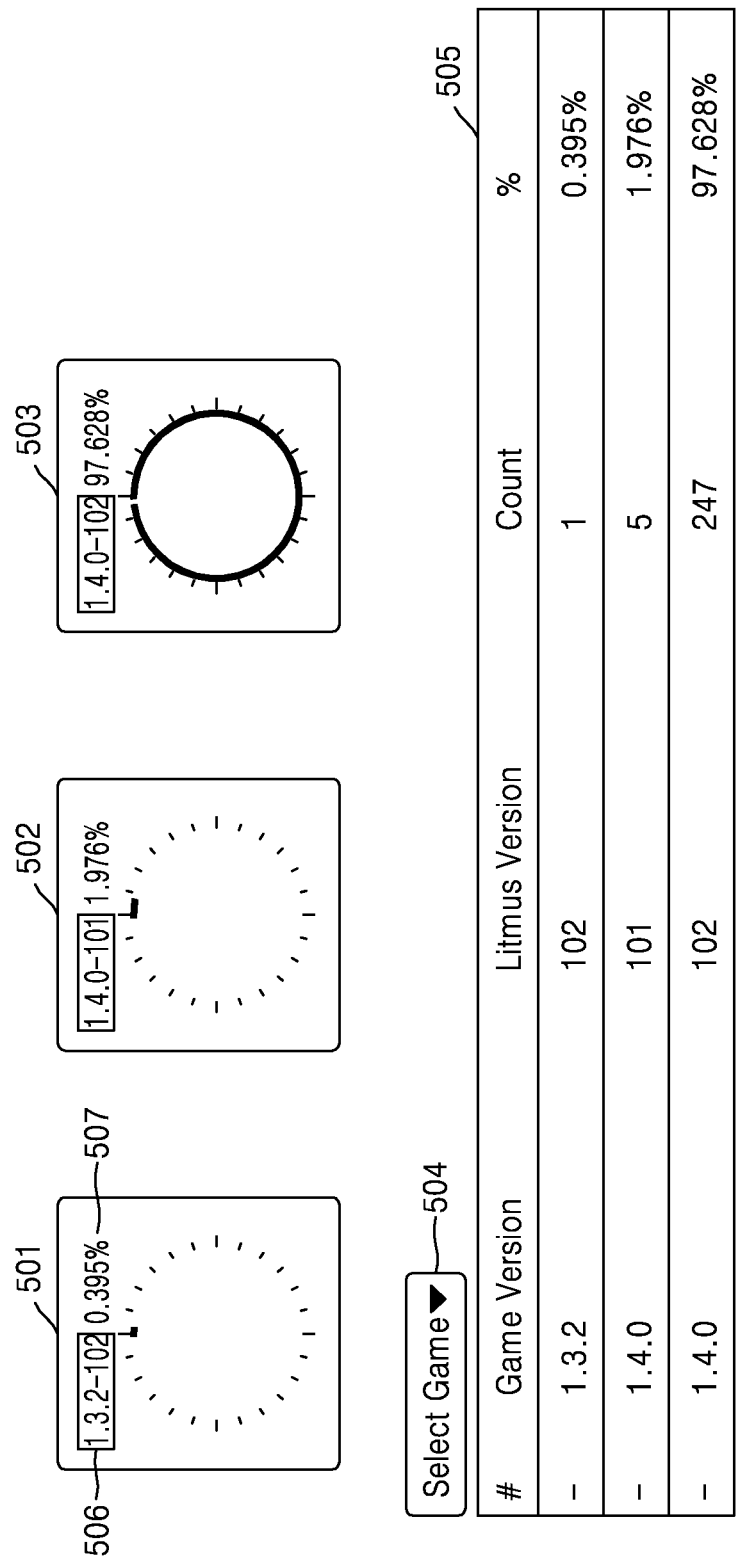
FIG. 15 shows an example of a screen providing statistical data provided by a distribution server, according to an embodiment of the inventive concept.

FIG. 15 shows an example of a screen providing statistical data provided by a distribution server according to an embodiment of the inventive concept. As illustrated in FIG. 15, a screen providing statistical data may display the number or a rate of distributions of an execution file of an application for each version. The screen providing statistical data may include screens 501, 502, and 503 providing the number and a rate of downloads for each version, version information 506 for each version, and rate information 507. The screen providing statistical data in FIG. 15 shows that, in a pie graph, 0.395 percent out of the total users using the application downloaded an execution file of version 1.3.2-102, 1.976 percent out of the total users downloaded an execution file of version 1.4.0-101, and 97.628 percent out of the total users downloaded an execution file of version 1.4.0-102. The screen providing statistical data may also include a selection region 504 through which a user selects an application, and provide the screen providing statistical data on a first application selected through the selection region 504. The screen providing statistical data may provide the number of downloads for each version of a game application distributed in a form of a list, each rate out of total users, and version information of an included security module in a lower region 505.

As described above, according to one or more embodiments of the inventive concepts, provided is a method of distributing an application in which a file related to an application that is not infected by a virus is distributed.

Also, according to one or more embodiments of the inventive concepts, provided is an application that prevents an installation and execution of a file infected by a virus from among downloaded files.

Also, according to one or more embodiments of the inventive concepts, an application distribution terminal that may re-install an invalid file by determining a validity of a file related to an application before the application is executed, and a method of operating the application distribution terminal, may be provided.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or example language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of the inventive concept as defined by the following claims.

What is claimed is:

1. A method of distributing an application, the method comprising:
   transmitting, by a distribution server, a signal requesting metadata to a user terminal where an application is installed;
   receiving, by the distribution server, a reply comprising first metadata from the user terminal;
   determining, by the distribution server, whether the application is forged, altered, or hacked by comparing the first metadata from the user terminal and second metadata corresponding to the application and stored in the distribution server;
   setting a connection with the user terminal to re-install the application on the user terminal in response to the distribution server determining that the application is forged, altered, or hacked;
   encrypting, by the distribution server, one or more installation files that install the application with a private key; and
   transmitting the encrypted one or more installation files via the set connection, to the user terminal.

2. The method of claim 1, wherein the transmitting the one or more encrypted installation files includes compressing the one or more encrypted installation files as a single file and then transmitting the single file to the user terminal.

3. The method of claim 1, further comprising
encrypting, by the distribution server, one or more installation files of one or more sub-applications interfacing with a main application;
storing metadata corresponding to the one or more sub-applications; and
managing each of the one or more sub-applications.

4. The method of claim 1, further comprising:
receiving, by the distribution server, a source file of an application from a first user terminal;
generating, by the distribution server, an execution file of the application by compiling the source file;
setting, by the distribution server, the execution file as a distribution version of the application with version information of the execution file; and
counting, by the distribution server, a number of downloads of the execution file to one or more second user terminals for each version information of the execution file, in response to a request for downloading the application received from the one or more second user terminals.

5. The method of claim 4, further comprising:
repeatedly performing the counting, and
generating statistical information related to the application by analyzing a result of the counting.

6. The method of claim 5, wherein the generating statistical information includes classifying a total number of downloads of the application and a number of downloads of the most recent version of the application into regions to generate the statistical information related to the application.

7. A method of distributing an application, the method comprising:
transmitting, by a distribution server, a first signal for requesting metadata to a user terminal where an application is installed;
receiving, by the distribution server, a reply comprising first metadata, from the user terminal, in response to the first signal;
determining, by the distribution server, whether the application is forged, altered, or hacked by comparing the first metadata from the user terminal and second metadata corresponding to the application and stored in the distribution server;
transmitting, by the distribution server, a second signal to the user terminal in response to the distribution server determining that the application is forged, altered, or hacked, the second signal requesting a patch file corresponding to the application;
receiving, by the distribution server, a reply comprising a first patch file from the user terminal, in response to the second signal;
generating, by the distribution server, one or more installation files corresponding to request information based on an analysis of the request information comprised in the first patch file;
setting, by the distribution server, a connection with the user terminal to transmit the one or more installation files;
encrypting, by the distribution server, the one or more installation files; and
transmitting the one or more encrypted installation files to the user terminal via the set connection.

8. The method of claim 7, wherein the transmitting the encrypted one or more installation files includes compressing the one or more installation files as a single file, and then transmitting the single file.

9. The method of claim 7, further comprising
encrypting, by the distribution server, one or more installation files of one or more sub-applications interfacing with a main application;
storing metadata corresponding to the one or more sub-applications; and
managing the metadata for each sub-application.

10. The method of claim 7, further comprising:
receiving, by a distribution server, a source file of an application from a first user terminal;
generating, by the distribution server, an execution file of the application by compiling the source file;
setting, by the distribution server, the execution file as a distribution version of the application with version information of the execution file; and
counting, by the distribution server, a number of downloads of the execution file to one or more second user terminals for each version information of the execution file, in response to a request for downloading the application received from the one or more second user terminals.

11. The method of claim 10, further comprising:
repeatedly performing the counting, and
generating statistical information related to the application by analyzing a result of the counting.

12. The method of claim 11, wherein the generating statistical information includes classifying a total number of downloads of the application and a number of downloads of the most recent version of the application into regions to generate the statistical information related to the application.

13. A method of operating an application, the method comprising:
transmitting, by a user terminal, a first request requesting a patch file corresponding to a first patch file comprised in an application to an application distribution server;
receiving, by the user terminal, a second patch file corresponding to the first patch file from the application distribution server, in response to the first request;
determining, by the user terminal, whether the first patch file is valid based on the first patch file and the second patch file; and
in response to the user terminal determining that the first patch file is not valid, detecting one or more error files from among execution files of the application based on the first patch file, and normalizing the one or more error files.

14. The method of claim 13, wherein the normalizing the one or more error files comprises:
transmitting a second request requesting a normal file corresponding to the one or more error files to the application distribution server;
receiving a first execution file corresponding to the normal file from the application distribution server, in response to the second request;
decrypting the first execution file with a public key;
deleting the first execution file in response to the first execution file not being decrypted; and
executing the first execution file to execute the normal file instead of the one or more error files in response to the first execution file being decrypted.

15. The method of claim 13, wherein the determining whether the first patch file is valid includes generating a unique code of the application by using an encryption table in which an array is changed according to a rule, and then determining a validity of the first patch file based on whether the unique code is the same as a unique code comprised in the first patch file.

16. The method of claim 13, wherein the transmitting a first request includes transmitting, by the user terminal, the first request for requesting the patch file corresponding to the first patch file comprised in the application to the application distribution server in response to a user making an input corresponding to a starting point of executing the application.

17. The method of claim 13, wherein the determining whether the first patch file is valid includes extracting information related to the application by analyzing the first patch file, and comparing the extracted information related to the application with basic information of the second patch file to determine whether the extracted information is valid with respect to the information related to an execution.

18. The method of claim 13, wherein the determining includes determining, by the user terminal, whether the application is forged, altered, or hacked by comparing the first patch files and the second patch file.

* * * * *